US011528280B2

(12) United States Patent
Bravo et al.

(10) Patent No.: US 11,528,280 B2
(45) Date of Patent: Dec. 13, 2022

(54) PROTECTION OF PRIVILEGED OPERATION ACCESS OF ELECTRONIC DEVICES

(71) Applicant: KYNDRYL, INC., New York, NY (US)

(72) Inventors: Cesar Augusto Rodriguez Bravo, Alajuela (CR); Kevin Jimenez Mendez, Heredia (CR); David Jaramillo, Durham, NC (US); David Lee, Round Rock, TX (US)

(73) Assignee: KYNDRYL, INC., New York, NY (US)

( * ) Notice: Subject to any disclaimer, the term of this patent is extended or adjusted under 35 U.S.C. 154(b) by 369 days.

(21) Appl. No.: 16/740,596

(22) Filed: Jan. 13, 2020

(65) Prior Publication Data

US 2021/0218751 A1  Jul. 15, 2021

(51) Int. Cl.
*H04L 9/40* (2022.01)
*H04W 64/00* (2009.01)
(Continued)

(52) U.S. Cl.
CPC ............ *H04L 63/107* (2013.01); *G06F 21/34* (2013.01); *H04L 63/0853* (2013.01);
(Continued)

(58) Field of Classification Search
CPC ......... G06F 21/6218; G06F 2221/2111; G06F 2221/2141; G06F 21/34; H04L 63/101;
(Continued)

(56) References Cited

U.S. PATENT DOCUMENTS 5,774,876 A   6/1998 Woolley
6,925,562 B2  8/2005 Gulcu
(Continued)

FOREIGN PATENT DOCUMENTS

JP   4387060 B2   12/2009

OTHER PUBLICATIONS

OSX Daily, How to Fix iTunes When It's Not Syncing with iPhone, iPad, or iPod Touch (Jun. 30, 2013) (Year: 2013).*
(Continued)

*Primary Examiner* — Theodore C Parsons
(74) *Attorney, Agent, or Firm* — John Kennel; Andrew M. Calderon; Calderon, Safran & Cole, P.C.

(57) ABSTRACT

A method for preventing unauthorized access of privileged operations of a first device. The method provides for one or more processors to detect an initiating action of a privileged operation of a first device. The one or more processors receive a current location of the first device. The one or more processors determine whether a pre-determined location matches the current location of the first device. In response to determining the current location of the first device fails to match the predetermined location, the one or more processors determine whether a pre-determined connection condition exists between the first device and an authorized device, and in response to determining an absence of the pre-determined connection condition between the first device and the authorized device, the one or more processors perform a first action disabling the privileged operation of the first device.

20 Claims, 4 Drawing Sheets

(51) Int. Cl.
*H04W 4/029* (2018.01)
*H04W 4/021* (2018.01)
*G06F 21/34* (2013.01)

(52) U.S. Cl.
CPC .......... *H04L 63/101* (2013.01); *H04L 63/108* (2013.01); *H04W 4/021* (2013.01); *H04W 4/029* (2018.02); *H04W 64/003* (2013.01)

(58) Field of Classification Search
CPC . H04L 63/107; H04L 63/108; H04L 63/0853; H04W 12/08; H04W 12/63; H04W 4/021; H04W 4/029; H04W 64/003
See application file for complete search history.

(56) References Cited

U.S. PATENT DOCUMENTS

| | | | |
|---|---|---|---|
| 9,959,694 B2 | 5/2018 | Lindsay | |
| 2015/0028996 A1* | 1/2015 | Agrafioti | A61B 5/318 340/5.82 |
| 2016/0066189 A1 | 3/2016 | Mahaffey | |
| 2016/0283420 A1* | 9/2016 | Haga | G06F 13/24 |
| 2016/0357994 A1* | 12/2016 | Kanakarajan | H04L 41/28 |
| 2017/0142090 A1* | 5/2017 | Mahaffey | H04W 12/084 |
| 2017/0180530 A1 | 6/2017 | Tucker | |
| 2018/0096174 A1 | 4/2018 | Finger | |
| 2019/0013947 A1 | 1/2019 | Rogers | |
| 2019/0347181 A1* | 11/2019 | Cranfill | G06F 3/04817 |
| 2020/0169400 A1* | 5/2020 | Thaler, III | G06F 21/602 |
| 2020/0186962 A1* | 6/2020 | Moeller | H04W 12/48 |

OTHER PUBLICATIONS

"Android anti-theft", T-Mobile, Copyright © 2002-2019 T-Mobile USA, Inc, 5 pps., <https://support.t-mobile.com/docs/DOC-21134>.

"App Lock", Google Play, © 2019 Google, 3 pps., <https://play.google.com/store/apps/details?id=com.domobile.applock>.

"Cerberus Phone Security (Antitheft)", Cerberus, printed from the Internet on Oct. 10, 2019, 1 pp., <https://www.cerberusapp.com/>.

"Find, lock, or erase a lost Android device", Google Account Help, © 2019 Google, 1 pp., <https://support.google.com/accounts/answer/6160491?hl=en>.

"Free Laptop Alarm Security Software", LAlarm™, © 2019 LAlarm, 3 pps., <https://www.lalarm.com/laptop-alarm-products/>.

"Help prevent others from using your device without permission", Nexus Help, © Google 2019, 2 pps., <https://support.google.com/nexus/answer/6172890?hl=en.

"How to Lock Your Android Phone Remotely?", XN SPY, © 2019 xnspy.com, 10 pps., <https://xnspy.com/how-to-lock-your-android-phone-remotely.html>.

"Reset your Android device to factory settings", Android Help, © 2019 Google, 1 pp., <https://support.google.com/android/answer/6088915?hl=en>.

"Restore your iPhone, iPad, or iPod to factory settings", Apple, Published Date: Oct. 7, 2019, 4 pps., <https://support.apple.com/en-us/HT201252>.

"Your Mobile Security Kit", © 2019—Prey, 13 pps., <https://preyproject.com/how-it-works/>.

Hom, "Mobile Device Security: Startling Statistics on Data Loss and Data Breaches", ChannelProNetwork, printed from the Internet on Oct. 10, 2019, <https://www.channelpronetwork.com/article/mobile-device-security-startling-statistics-data-loss-and-data-breaches>.

O'Reilly, "How to lock down and find Android and Windows phones", Cnet, Sep. 25, 2012, 10 pps., <https://www.cnet.com/how-to/how-to-lock-down-and-find-android-and-windows-phones/>.

"How to Disable Factory Reset Android Protection?", updated on Mar. 28, 2019, © 2020—MaxMovil, 38 pps (includes English translation of document), <https://www.maxmovil.com/blog/solucion-de-problemas/desactivar-factory-reset-protection-android/>.

* cited by examiner

PROTECTION OF PRIVILEGED OPERATION ACCESS OF ELECTRONIC DEVICES

FIELD OF THE INVENTION

The present invention relates generally to the field of electronic device security, and more particularly to preventing unauthorized access and control of device privileged operation settings.

BACKGROUND OF THE INVENTION

IOT devices (Internet of Things), mobile devices, and smartphones in particular, have attained unprecedented levels among the world-wide population. Some estimates predict there will be 6.7 billion smartphones in operation by 2022, and additional types of smart devices, such as smart watches, continue to propagate and be embraced by the public. Smart devices enable features and functions that support users in daily activities, communications, and information access. Users of IOT and smart devices typically install applications (apps) that perform useful or interesting functions, and users often include and store personal, private, and important information on their respective smart device for easy access and integration with apps.

Some IOT and most smart devices are relatively small in size and easily portable, making the convenient to accompany the user. IOT devices and smart devices, hereafter referred to collectively as "device(s)" or represented collectively as "smartphone(s)", are enabled with privileged operation features that allow access to device settings, giving user's a way to recover from various conditions. IOT and smart devices may include pass codes, or other features intended to protect data containing personal, business or other valuable information.

SUMMARY

Embodiments of the present invention disclose a method, computer program product, and system. The embodiments include a method for preventing unauthorized access of privileged operations of a first device. The method provides for one or more processors to detect an initiating action of a privileged operation of a first device. The one or more processors receive a current location of the first device. The one or more processors determine whether a pre-determined location matches the current location of the first device. In response to determining the current location of the first device fails to match the predetermined location, the one or more processors determine whether a pre-determined connection condition exists between the first device and an authorized device, and in response to determining an absence of the pre-determined connection condition between the first device and the authorized device, the one or more processors perform a first action disabling the privileged operation of the first device.

DETAILED DESCRIPTION

Figure 1:
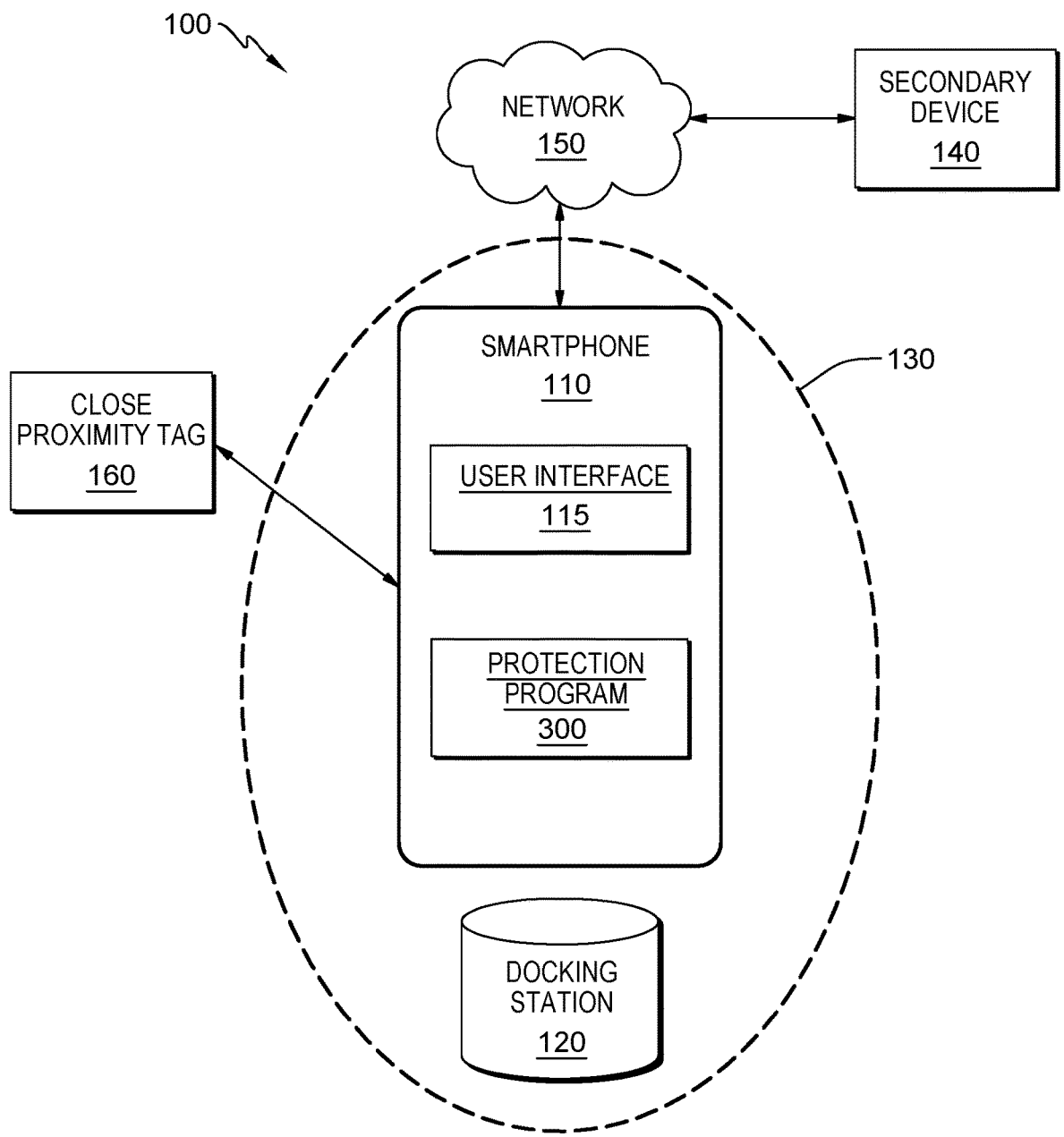
FIG. 1 is a functional block diagram illustrating a distributed data processing environment, in accordance with an embodiment of the present invention.

Embodiments of the present invention recognize that the number of mobile communication devices continues to grow, with estimates of over 5 billion devices which equates to two thirds of the global population having mobile devices. Mobile devices include smart phones, cell phones, tablets, and cellular-enabled IoT devices (Internet of Things). Demand for mobile devices remains strong with estimates of smartphones exceeding 6 billion globally by 2022. Statistical survey results indicate that smartphone owners have a dependency, even addition to their mobile device.

Embodiments of the present invention acknowledge that in parallel with the growth of demand and dependency on mobile devices, theft and loss of mobile devices is a growing concern. The function and capabilities of smart mobile devices, especially smartphones, has increased in both appeal to users, and in price to own one of the more capable units, which adds incentive to those looking for opportunities to steal devices. Stolen devices are often reconfigured for remarketing by initiating a factory reset feature of the unit, enabling access to device settings and memory. In some cases, possession of a stolen high-level smartphone is considered as good as cash, doing little to dissuade theft. Embodiments of the present invention recognize that mobile devices, particularly smartphones, may include personal information, valuable business data, or other content stored in the device's memory. In addition to the loss of the device, users want protection from unauthorized access that may compromise the user, expose the user to identity theft, or risk loss of other valuable data. In some embodiments, the smart device may include confidential business data, trade secrets, or other valuable data that companies and corporations may backup but want protection from access by other entities.

Embodiments of the present invention provide for a conditional disablement mechanism to deter theft of mobile devices. In some embodiments, the rare need for a user to initiate a factory reset action is authorized by establishing a pre-defined location and detection by the smart device (by global positioning system (GPS) function) of whether the device is located within a geofence of the pre-defined location. In response to determining the smart device is located outside of the pre-defined geofence location, embodiments of the present invention prevent initiation of the factory reset of the device. Embodiments of the present invention acknowledge that smartphones may be a more-targeted mobile device; however, cellular IoT devices and cell phones containing data in memory may also present exposure to users and include some level of remarketing or resale value incentive to potential thieves. Hereafter, for simplicity and clarity, the term "smartphone" will be used to convey the description, functions, and workings of embodiments of the present invention, and collectively represent a range of mobile data processing devices without limiting embodiments of the invention to only smartphones.

In some embodiments, enablement of highly restrictive tasks or privileged operations of the smartphone depend on one or a combination of geographic location-based security, and connection conditions to one or more authorized devices. As an embodiment example, the enablement of a factory reset feature of the smartphone requires the device to be located within a geofence of a predetermined GPS location. If the smartphone location is determined to be outside the geofence area, then check is performed to determine whether a connection condition between the smartphone and a designated docking or charging station of the device exists, and absent the detection of the designated docking or charging connection, embodiments prevent activation of the factory reset feature of the device.

In yet other embodiments, enablement of the factory reset feature of the smartphone depends on detection of a connection to a secondary "authorized" device previously paired with the smartphone. The connection condition with the authorized device is limited to close proximity of the smartphone, such as connections made by NFC (near-field communication), RFID (radio frequency identification), Bluetooth, or other close proximity wireless connection. In some embodiments, the connection condition includes a physical connection between the smartphone and an authorized device, such as a docking station or a charging device, and may include a wired connection to an authorized device. If a connection condition with the authorized device is not detected by embodiments of the present invention, then the factory reset feature is disabled.

In some embodiments of the present invention, in addition to disabling the factory reset feature of the smartphone, other protective actions are performed to protect access to data stored on the smartphone. In some embodiments, in response to detecting a factory reset command and determining that an authorizing condition does not exist, the smartphone receives instruction to determine the current location of the smartphone and send the location in a message or other communication, to a designated recipient, and perform additional locking of access to features and data of the smartphone. The recipient may be an email address, another mobile device, or a device of a trusted user, for example. In other embodiments, in response to detecting initiation of a factory reset feature of the device and determining that an authorizing condition does not exist, embodiments disable the factory reset feature/function, and the smartphone receives instruction to overwrite the data stored on the smartphone, effectively erasing the data, and may include actions disabling the smartphone permanently. Embodiments of the present invention, in response to the loss of a smartphone with an attempt to activate the factory reset feature of the smartphone, results in a non-functional, data-cleansed device, totally worthless to the perpetrator, and thus providing a deterrence.

In some embodiments of the present invention, additional protective actions may be performed in response to detecting initiation of a privileged operations, such as a factory reset function, and determining the location of the device is outside a geofence distance range from a predefined global positioning system (GPS) location, and that a connection condition with an authorized device has not been established.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes smartphone 110, docking station 120, pre-determined location 130, secondary device 140, and NFC tag 160, all connected via network 150. Network 150 can be, for example, a local area network (LAN), a wide area network (WAN), such as the Internet, a virtual local area network (VLAN), or any combination that can include wired, wireless, or optical connections. In general, network 150 can be any combination of connections and protocols that will support communications between smartphone 110, docking station 120, secondary device 140, and NFC tag 160, in accordance with embodiments of the present invention.

In some embodiments of the present invention, smartphone 110 is a mobile smart device and includes user interface 115, and protection program 300. Smartphone 110 is depicted as communicatively connected to secondary device 140 and in proximity of docking station 120. In some embodiments, smartphone 110 can detect NFC tag 160 within a defined distance range of smartphone 110.

In some embodiments, smartphone 110 can be a standalone mobile computing device, a smart phone, a tablet computer, a smart watch, a smart TV, a laptop computer, or any other mobile electronic device or computing system capable of receiving, sending, and processing data. In other embodiments, smartphone 110 can be a computing device interacting with applications and services hosted and operating in a cloud computing environment. In another embodiment, smartphone 110 can be a netbook computer, a desktop computer, a personal digital assistant (PDA), or other programmable electronic device capable of communicating with docking station 120, secondary device 140, and NFC tag 160, and other computing devices (not shown) within distributed data processing environment 100 via network 150. Smartphone 110 includes internal and external hardware components, depicted in FIG. 4.

User interface 115 provides an interface to access features and functions of smartphone 110. In some embodiments of the present invention, user interface 115 provides access to protection program 300, operating on smartphone 110. User interface 115 also supports access to other applications, features, and functions of smartphone 110 (not shown). User interface 115 supports access to alerts, notifications, and other forms of communications. In one embodiment, user interface 115 may be a graphical user interface (GUI) or a web user interface (WUI) and can receive user input and display text, documents, web browser windows, user options, application interfaces, and instructions for operation, and include the information (such as graphic, text, and sound) that a program presents to a user and the control sequences the user employs to control the program. In another embodiment, user interface 115 may also be mobile application software that provides an interface to features and functions of smartphone 110. User interface 115 enables a user of smartphone 110 to receive, view, hear, and respond to input, access applications, and perform functions available.

Protection program 300 operates on smartphone 110 and performs actions disabling privileged operation access in response to detecting an initiating action of the privileged operation and confirming the absence of pre-determined conditions. In some embodiments, protection program 300 may operate in a cloud environment comprised of multiple computing and networking devices and connect communicatively with smartphone 110. In some embodiments of the present invention, a factory reset feature of a smartphone is considered one of a set of privileged operations of the device. Protection program 300 detects initiation of a factory reset feature (depressing a button or insert, etc.) and determines the current location of the smartphone and compares the current location to a pre-determined location, such as pre-determined location 130. The current location and pre-determined location may be derived from GPS services of smartphone 110. The pre-determined location may include a geofence defining a range of distance from a designated GPS location.

In response to determining the pre-determined location fails to match the current location of smartphone 110, protection program 300 determines whether a connection condition between smartphone 110 and an authorized device exists. In response to determining the connection condition does not exist, protection program 300 performs a security action, which includes disabling the factory reset feature of smartphone 110. If the current location of the smartphone and predetermined location (within the geofence) match, protection program 300 enables the factory reset feature of smartphone 110. In some embodiments, in which the current and pre-defined locations of the smartphone 110 do not match, and protection program 300 confirms a connection condition exists for an authorized device, protection program 300 enables the factory reset feature of smartphone 110. In some embodiments, to enable the factory reset feature of smartphone 110, protection program 300 requires a combination of the location of smartphone 110 within pre-determined location 130 and detection of one or more connection conditions to authorized devices.

In other embodiments, protection program 300 may perform an additional security action, such as over-writing data stored on smartphone 110, and disabling access to other features, such as deactivating touch screens, buttons and input-output ports (I/O). In some embodiments, protection program 300 recognizes close proximity tags 160, which include near field communication (NFC), radio frequency identification (RFID), and Bluetooth technology allowing exchange of information between devices that are in close proximity. In still other embodiments, protection program 300 sends the current location of smartphone 110 in a message to a pre-determined recipient, in addition to disabling the privileged operation of smartphone 110, such as the factory reset function, subsequent to determining that smartphone 110 is not within the pre-determined location geofence, and smartphone 110 is not in a connection condition with an authorized device. For example, the message sent by protection program 300 that includes the current location of smartphone 110 may contain the GPS coordinates of the location included in a short message service (SMS) text message, or an email message sent to a designated receiving address.

Docking station 120 depicts a recognized device associated with smartphone 110. In some embodiments of the present invention, docking station 120 performs power charging functions for smartphone 110, and includes establishing a connection condition when smartphone 110 is "docked" with docking station 120. Docking station 120 is recognized as an authorized device subsequent to establishing the connection condition with smartphone 110. In some embodiments, protection program 300 recognizes the connection condition of docking station 120 as an authorized device, when smartphone 110 is physically and/or communicatively connected with docking station 120 and enables the privileged operations of smartphone 110. In some embodiments close proximity tag 160 may be included or attached to docking station 120 for smartphone 110 to recognize docking station 120 as an authorized device and provide enablement of privileged operations of smartphone 110, such as the factory reset feature. In some embodiments, smartphone 110 is physically connected to docking station 120 by a wired cable.

Pre-determined location 130 depicts a geofence boundary defining a range of distance from a location point, designating an area as a pre-determined location. In some embodiments of the present invention, protection program 300 determines the location of smartphone 110 in response to detecting an initiating action of a privileged operation, such as initiating a factory reset function of smartphone 110. The location of smartphone 110 is determined by GPS services of smartphone 110 and compared to pre-determined location 130. If protection program 300 determines that the location of smartphone 110 is within the area defined by pre-determined location 130, then protection program 300 enables the privileged operations of smartphone 110. If the location of smartphone 110 falls outside of the geofence defined by pre-determined location 130, then protection program 300 disables the factory reset function of smartphone 110 and in some embodiments, determines whether a connection condition exists with smartphone 110.

Secondary devices 140 represent one or more electronic devices enabled to pair with or establish a wireless connection with smartphone 110 within near distances (typically less than 20 meters). In some embodiments of the present invention, secondary devices 140 form close proximity wireless connections with smartphone 110, such as a Bluetooth connection. In some embodiments, secondary devices 140 may be, but are not limited to wireless devices, such as speakers, headphones, ear buds, headsets, computing devices, locking devices, voice assistants, smart watches, automobiles, arm band sensors, keyboards, and pointing devices. In some embodiments a secondary device may include a close proximity tag the includes NFC or RFID technology and enables the device to be recognized by smartphone 110.

Close proximity tag 160 includes physical tags containing circuitry components providing communication connections to smartphone 110 via close proximity communication technology, such as NFC, RFID, and Bluetooth technology. In some embodiments of the present invention, close proximity tag 160 is attached or included in an object or device to establish the object or device as an "authorized device", recognized by protection program 300, and used to determine whether to enable privileged operations of smartphone 110. Close proximity tag 160 provides flexibility for users to create "authorized devices" of objects not typically associated with proximity security.

In some embodiments of the present invention, protection program 300 is configured to enable user-designation of authorized devices with which smartphone 210 determines an authorization condition. A user of smartphone 110 performs a registration operation in which authorization conditions and authorized devices are identified. In some embodiments, the user may define a particular location area as a geofence, designating that enablement of privileged operations of smartphone 110 require smartphone 110 to be located by protection program 300 (using a GPS function, for example) within the designated geofence area. In other embodiments, the user identifies authorized devices, such as docking station 120, secondary device 140 and close proximity tag 160, which enable privileged operations of smartphone 110 if a designated connection condition with the respective authorized device is detected by protection program 300 operating on smartphone 110. For example, protection program 300 detects that smartphone 110 is connected by a near-proximity connection to secondary device 140 and recognizes secondary device as an authorized device meeting a user-designated connection condition. Protection program 300 enables privileged operations for smartphone 110.

Figure 2A:
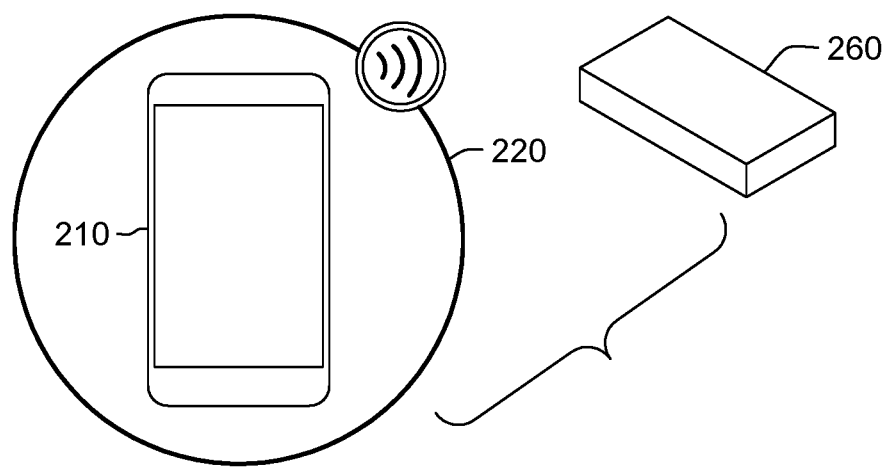
FIG. 2A illustrates an example near-proximity connection condition associated with an enablement of privileged operations of a mobile device, in accordance with embodiments of the present invention.

FIG. 2A illustrates an example near-proximity connection condition associated with enablement of privileged operations of a mobile device, in accordance with embodiments of the present invention. FIG. 2A includes smartphone 210, wireless connection condition 220, and speaker 260. Wireless connection condition 220 is a near-proximity connection condition that includes smartphone 210 within a limited proximity range in which smartphone 210 can detect a wireless connection condition with an authorized device, such as speaker 260. FIG. 2A depicts that speaker 260 is outside of a connection proximity range of wireless connection condition 220 and therefore fails to detect a connection condition with speaker 260 as an authorized device. Smartphone 210 fails to detect the connection condition with speaker 260 as an authorized device; and therefore, fails to enable privileged operations of smartphone 210.

Wireless connection condition 220 presents one conditional state from which protection program 300 determines enablement or disablement of privileged operations, such as a factory reset function of smartphone 210, in response to detecting an initiating action of the privileged operation. In some embodiments of the present invention, wireless connection condition 220 may be the only condition considered by protection program 300 in determining disablement of a privileged operation of smartphone 210, whereas in other embodiments, wireless connection condition 220 is considered subsequent to another privileged operation enablement condition, such as determining the location of smartphone 210. In some embodiments only one enablement condition needs to be met to enable privileged operations of smartphone 210. In other embodiments, a combination of enablement conditions needs to be met to enable privileged operations of smartphone 210.

Figure 2B:
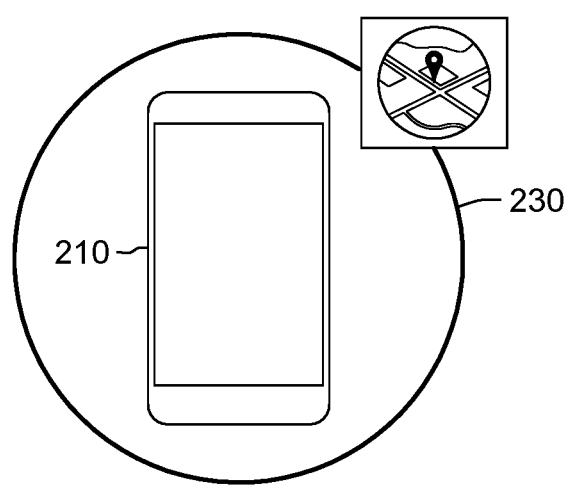
FIG. 2B illustrates an example location connection condition associated with an enablement of privileged operations of a mobile device, in accordance with embodiments of the present invention.

FIG. 2B illustrates an example location connection condition associated with an enablement of privileged operations of mobile device 210, in accordance with embodiments of the present invention. FIG. 2B includes smartphone 210 and location connection condition 230. Location proximity 230 depicts a representation of smartphone 110 at a location within a geofence area. If protection program 300 detects initiation of a privileged operation, such as a factory reset function of smartphone 210, then protection program 300 sends instructions for determining the current location of smartphone 210 and compares the current location to the pre-determined location geofence area. If smartphone 210 is located within the pre-determined location geofence area, then privileged operations of smartphone 210 are enabled. However, if smartphone 210 is determined to be located outside of the pre-determined location geofence area, then privileged operations of smartphone 210 are disabled.

Figure 2C:
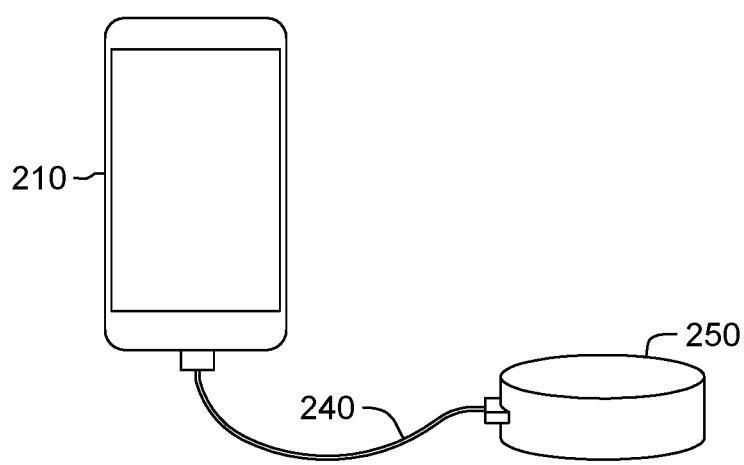
FIG. 2C illustrates an example physical connection condition associated with an enablement of privileged operations of a mobile device, in accordance with embodiments of the present invention.

FIG. 2C illustrates an example physical connection condition associated with an enablement of privileged operations of mobile device 210, in accordance with and embodiment of the present invention. FIG. 2C includes smartphone 210, docking station 250, and wire connection 240. Wire connection 240 is depicted as enabling a physical connection of smartphone 210 to docking station 250. In some embodiments, docking station 250 provides charging power to smartphone 210 and is uniquely identified by smartphone 210 when connected by wire connection 240. In some embodiments, the physical connection by wire connect 240 enables smartphone 210 to detect docking station 250 as an authorized device and determines that privileged operations of smartphone 210 are enabled. In the depicted embodiment, the connection condition between smartphone 210 and docking station 250 is made physically by a wire connection 240. In other embodiments, the connection condition may be made by physical contact between smartphone 210 and docking station 250.

Figure 3:
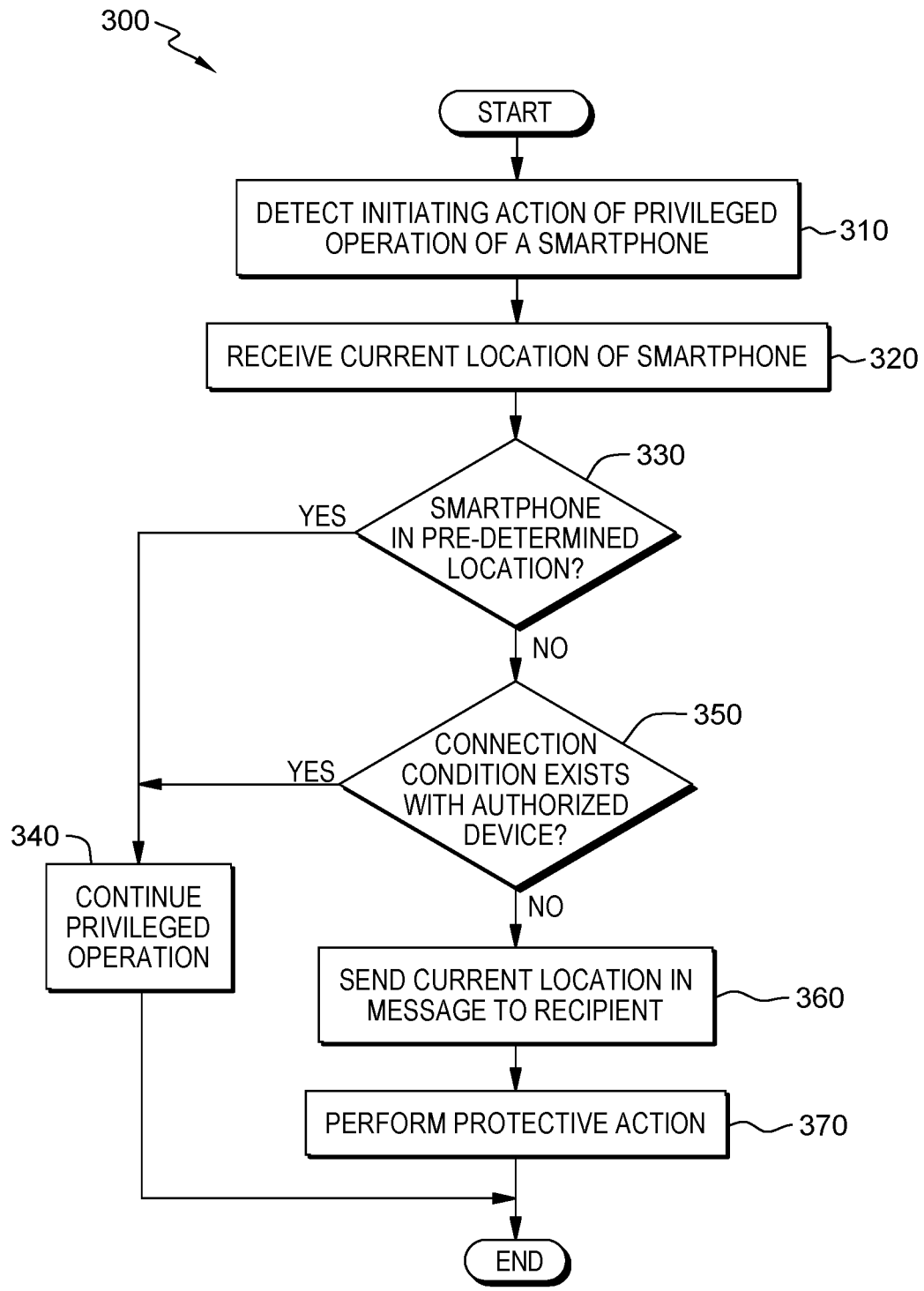
FIG. 3 is a flowchart depicting operational steps of a protection program, operating in the distributed data processing environment of FIG. 1, in accordance with embodiments of the present invention.

FIG. 3 is a flowchart depicting operational steps of protection program 300, operating in distributed data communications environment 100, in accordance with embodiments of the present invention. For purposes of clarity, the description and examples of operational steps of FIG. 3 presented below will be directed specifically to a smartphone as a mobile device, however embodiments of the present invention are not limited to smartphone devices.

Protection program 300 detects an initiating action of a privileged operation of a mobile device (step 310). Protection program 300, operating on smartphone 110 (FIG. 1) receives detection of an initiating action of a privileged operation of smartphone 110. In some embodiments of the present invention, a factory reset function is a privileged operation of smartphone 110. In some embodiments, the initiation action of the factory reset feature may be a pin depression of a receded button located on smartphone 110. Detection of the pin depression of the factory reset feature is sent to protection program 300, and the factory reset function of smartphone 110 remains idle pending enablement from protection program 300.

For example, an unauthorized user obtains possession of smartphone 110 and depresses a pin hole for the factory reset feature of smartphone 110. Protection program 300, operating on smartphone 110 detects the initiating action of the factory reset button and the factory reset feature is not immediately activated, pending a response from protection program 300 enabling or disabling the factory reset function of smartphone 110.

Protection program 300 receives the current location of the smartphone (step 320). Subsequent to detecting the initiating action of the privileged operation of smartphone 110, protection program 300 requests and receives the current location of smartphone 110. In some embodiments of the present invention, smartphone 110 uses a GPS feature to determine the current location and sends the location information to protection program 300. In other embodiments, smartphone 110 may be communicatively connected to one or more cellular transmission towers with identified locations, and the current location of smartphone 110 can be estimated within a range of the connected towers. For example, an unauthorized second user has removed smartphone 110 from the coat of a first user who is the owner of smartphone 110. The second user travels to a different location and attempts to initiate the factory reset function of smartphone 110, and the initiating action is detected and sent to protection program 300, which requests and receives the current location of smartphone 110 as determined by the GPS function of smartphone 110.

Protection program 300 determines whether the current location of the smartphone is within the pre-determined location (decision step 330). Protection program 300 is configured with a pre-determined location set by the user of smartphone 110. In some embodiments of the present invention, the pre-determined location is defined by a geofence area that is defined by a specific distance from a designated point. Protection program 300 can use the pre-determined location as a qualification to enable certain privileged operations of smartphone 110. In some embodiments of the present invention, the factory reset feature of smartphone 110 is a privileged operation and requires smartphone 110 to be located within the geofence of the pre-determined location to enable the privileged operations. For the case in which the smartphone current location is within the pre-determined location (decision step 330, "YES" branch), protection program 300 proceeds to continue to perform the privileged operation (step 340). Protection program 300 enables the privileged operations and ends.

For the case in which protection program 300 determines that the smartphone is not located within the pre-determined location (decision step 330, "NO" branch), protection program 300 determines whether a connection condition exists between the smartphone and an authorized device (decision step 350). Protection program 300 determines whether one or more authorized devices are detected by smartphone 110, and whether a connection can be established between smartphone 110 and the authorized device. In some embodiments, an authorized device may utilize a physical connection, such as smartphone 110 connected to a docking station or charging device designated as an authorized device. The physical connection may include a wired connection between the authorized device and smartphone 110. In other embodiments, the connection condition between smartphone 110 and the authorized device may be a wireless connection having limited range, such as a Bluetooth connection or an RFID or NFC connection. For the case in which protection program 300 determines that a connection condition does exist between smartphone 110 and the authorized device, (decision step 350 "YES" branch), protection program 300 proceeds to continue to perform the privileged operation (step 340). Protection program 300 performs the privileged operation and ends.

For example, protection program 300 determines that smartphone 110 is not located in the pre-determined location; however, smartphone 110 is physically connected to docking station 250 (FIG. 2C), which is designated as an authorized device with respect to privileged operations of smartphone 110, such as activating the factory reset function. Protection program 300 enables the factory reset function and ends. In some embodiments of the present invention, an authorized device may be any designated device with which smartphone 110 has or can establish a physical or wireless connection, such as Bluetooth pairing between smartphone 110 and the device. In some embodiments a plurality of devices may be designated as "authorized," and a detected connection condition between any of the authorized devices and smartphone 110 satisfies the conditions of protection program 300. In other embodiments, protection program 300 may require detection of connection conditions between smartphone 110 and multiple authorized devices to satisfy authorization conditions for protection program 300 to enable privilege operations for smartphone 110. In yet other embodiments, protection program 300 may require both smartphone 110 location within the pre-determined location area detection of connection conditions between smartphone 110 and one (or more than one) authorized device(s).

For the case in which protection program 300 determines that a connection condition between smartphone 110 and an authorized device does not exist (decision step 350, "NO" branch), protection program 300 sends the current location of smartphone 110 in a message to a predetermined recipient (step 360). Protection program 300 recognizes that smartphone 110 may be in a compromised condition, based on the location of smartphone 110 being outside of the pre-determined location and determining that connection conditions between smartphone 110 and one or more authorized devices does not exist. Protection program 300 includes the current location information of smartphone 110 in a message and sends the information to a pre-determined recipient. In some embodiments, the recipient may be an email or messaging account that the user of smartphone 110 can access by multiple devices. In other embodiments, the recipient may be another device accessible by the user, or to a trusted user's device previously designated by the user of smartphone 110.

Protection program 300 performs a protective action directed to the smartphone (step 370). Protection program 300 performs a disabling action for the privileged operations of smartphone 110, preventing activation of functions that enable reprograming of smartphone 110 for possible resale. In some embodiments, protection program 300 also initiates over-writing and/or encrypting of data stored on smartphone 110, preventing access to private or privileged information regarding the user of smartphone 110, potentially preventing identity theft or business confidential data theft of company-issued smartphones.

In other embodiments protection program 300 disables all access functions of the device, effectively "bricking" the device such that it is no longer usable. In yet other embodiments, protection program 300 may initiate a delay in enabling privileged operations pending possible recovery of smartphone 110 based on location information forwarded to a designated recipient and performing permanent disablement of privileged operations and over-writing of data subsequent to expiration of a pre-determined timeframe. Having performed protective actions, protection program 300 ends.

For example, protection program 300 receives detection of initiating action of a factory reset feature of smartphone 110 and has determined the location and the connection condition detection of smartphone 110 confirm that protective actions are to be taken. Protection program 300 permanently disables the factory reset function of smartphone 110 and over-writes the existing data on smartphone 110 with random characters. In a different example, protection program 300 maintains a temporary disablement of the factory reset feature of smartphone 110 for 24 hours, enabling opportunity to potentially recover smartphone 110. Subsequent to the expiration of the 24-hour period, protection program 300 confirms the location of smartphone 110 relative to the pre-determined location and checks the connection condition between smartphone 110 and a designated authorized device, for example, smartphone 210 and connection condition 220 with speaker 260 (FIG. 2A). Determining that the location of smartphone 110 does not match the pre-determined location range, and that smartphone 110 has no connection condition with a pre-determined authorized device, protection program 300 permanently disables privileged functions of smartphone 110 and over-writes data included in smartphone 110. Having performed the protective actions, protection program 300 ends.

Figure 4:
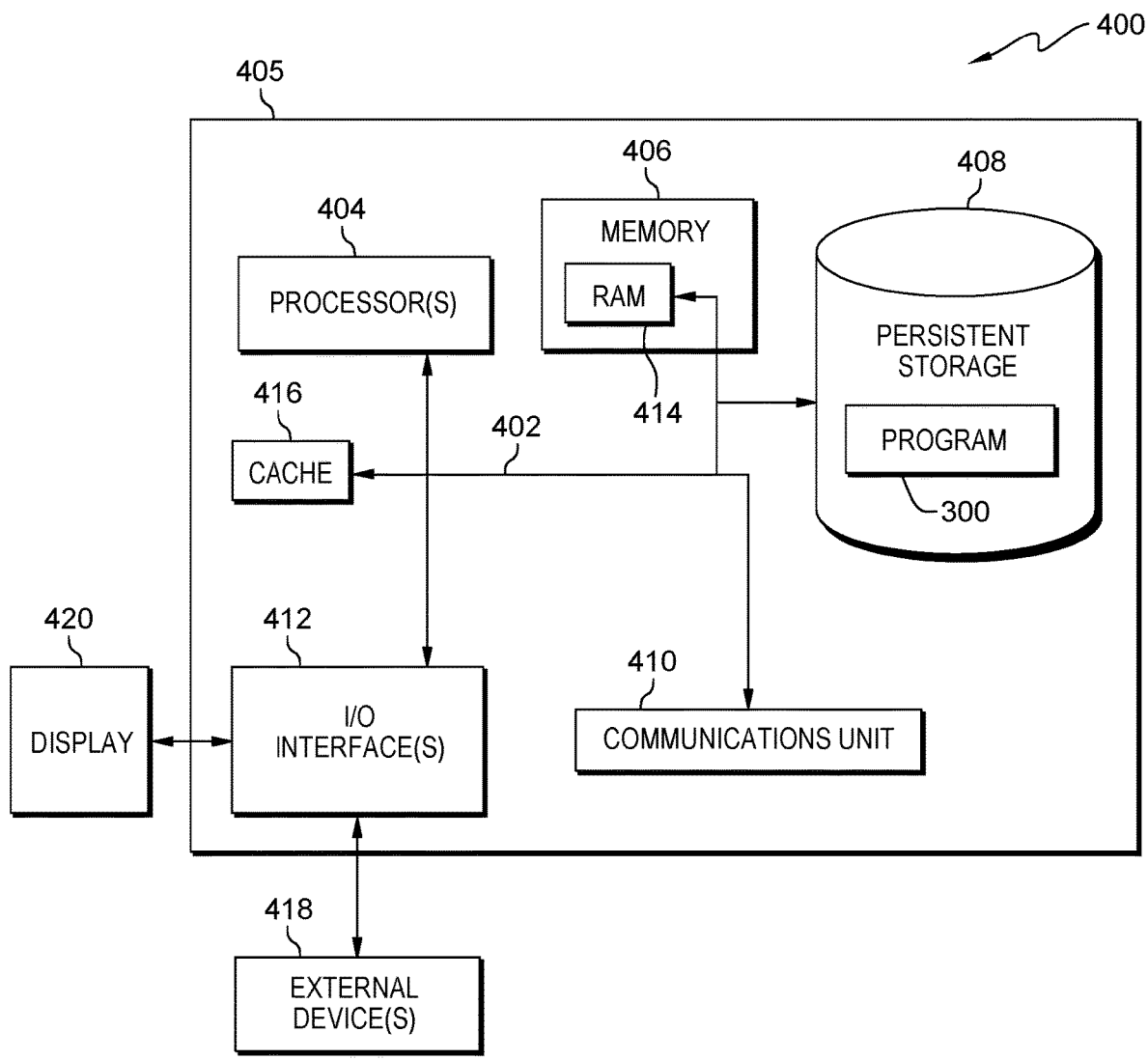
FIG. 4 depicts a block diagram of components of a computing system, including a computing device configured with capability to operationally perform the protection program of FIG. 3, in accordance with an embodiment of the present invention.

FIG. 4 depicts a block diagram of components of computing system 400, including computing device 405, configured to include or operationally connect to components depicted in FIG. 1, and capable of performing operational steps of protection program 300 of FIG. 3, in accordance with an embodiment of the present invention, in accordance with an embodiment of the present invention.

Computing device 405 includes components and functional capability similar to components of smartphone 110 (FIG. 1), in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 405 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406, cache memory 416, and persistent storage 408 are computer readable storage media. In this embodiment, memory 406 includes random access memory (RAM) 414. In general, memory 406 can include any suitable volatile or non-volatile computer readable storage media.

In one embodiment, protection program 300 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of distributed data processing environment 100. In these examples, communications unit 410 includes one or more network interface cards. Communications unit 410 may provide communications through the use of either or both physical and wireless communications links. Protection program 300 may be downloaded to persistent storage 408 through communications unit 410.

I/O interface(s) 412 allows for input and output of data with other devices that may be connected to computing system 400. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g. protection program 300 can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for preventing unauthorized access of privileged operations of a first device, the method comprising:
   one or more processors detecting an initiating action of a privileged operation of a first device;
   the one or more processors receiving a current location of the first device;
   the one or more processors determining whether a pre-determined location matches the current location of the first device;
   in response to determining the current location of the first device fails to match the pre-determined location, the one or more processors determining whether a pre-determined connection condition exists between the first device and an authorized device; and
   in response to determining an absence of the pre-determined connection condition between the first device and the authorized device, the one or more processors performing a first action disabling the privileged operation of the first device, wherein the pre-determined connection condition includes a combination of two or more pre-determined connection conditions.

2. The method of claim 1, wherein the pre-determined location is a geofence extending a defined distance range from a pre-determined location identified by a global positioning system (GPS) service of the first device.

3. The method of claim 1, wherein the pre-determined connection condition includes a pre-determined wireless connection between the first device and the authorized device.

4. The method of claim 1, wherein the pre-determined connection condition includes a physical connection between the first device and the authorized device.

5. The method of claim 1, wherein the authorized device is identified by a wireless proximity tag added to the authorized device.

6. The method of claim 1, further comprising:
   in response to performing the first action, the one or more processors overwriting data content of the first device.

7. The method of claim 1, wherein the connection condition is a physical connection with a charging device as the authorized device, and the charging device is uniquely identified by the first device.

8. The method of claim 1, wherein performing the first action disabling the privileged operation of the first device includes sending the current location of the first device in a message to a pre-determined recipient.

9. The method of claim 1, wherein the one or more processors performing the first action disabling the privileged operation, further comprises:
   the one or more processors disabling a factory reset function as the privileged operation of the first device; and
   the one or more processors over-writing data stored on the first device.

10. A computer program product for preventing unauthorized access of privileged operations of a first device, the computer program product comprising:
one or more computer readable storage media; and
program instructions stored on the one or more computer readable storage media, the program instructions comprising:
program instructions to detect an initiating action of a privileged operation of a first device;
program instructions to receive a current location of the first device;
program instructions to directly compare the current location of the first device to a pre-determined location to determine whether the current location of the first device is within the pre-determined location;
in response to determining the current location of the first device is not within the pre-determined location, program instructions to determine whether a pre-determined connection condition exists between the first device and an authorized device; and
in response to determining an absence of the pre-determined connection condition between the first device and the authorized device, program instructions to perform a first action disabling the privileged operation of the first device.

11. The computer program product of claim 10, wherein the pre-determined location is a geofence extending a defined distance range from a pre-determined location identified by a global positioning system (GPS) service of the first device.

12. The computer program product of claim 10, wherein the pre-determined connection condition includes a wireless connection between the first device and the authorized device.

13. The computer program product of claim 10, further comprising:
program instructions to determine the pre-determined connection condition, wherein the pre-determined connection condition includes a physical connection between the first device and the authorized device; and
program instructions to determine whether the physical connection between the first device and the authorized device is a wired connection and the authorized device is a uniquely identified charging device.

14. The computer program product of claim 10, wherein the authorized device is identified by a wireless proximity tag added to the authorized device.

15. The computer program product of claim 10, wherein the pre-determined connection condition includes a combination of two or more pre-determined connection conditions.

16. A computer system for preventing unauthorized access of privileged operations of a first device, the computer system comprising:
one or more computer processors;
one or more computer readable storage media; and
program instructions stored on the one or more computer readable storage media, the program instructions comprising:
program instructions to detect an initiating action of a privileged operation of a first device;
program instructions to receive a current location of the first device;
program instructions to directly compare the current location of the first device to a pre-determined location to determine whether the current location of the first device is within the pre-determined location;
program instructions to determine whether a pre-determined connection condition exists between the first device and an authorized device in response to determining the current location of the first device is not within the pre-determined location; and
program instructions to perform a first action disabling the privileged operation of the first device in response to determining an absence of the pre-determined connection condition between the first device and the authorized device.

17. The computer system of claim 16, wherein the pre-determined connection condition includes a plurality of pre-determined connection conditions in which detecting at least one of the plurality of pre-determined connection conditions satisfies the pre-determined connection condition requirement between the first device and the authorized device; and
wherein the program instructions further comprise:
program instructions to overwrite data content of the first device in response to performing the first action; and
program instructions to disable access functions of the first device in response to performing the first action.

18. The computer system of claim 16, wherein the pre-determined connection condition includes a combination of two or more pre-determined connection conditions, and wherein the connection condition comprises a physical connection with a charging device as the authorized device, and the charging device is uniquely identified by the first device.

19. The computer system of claim 16, wherein performing the first action disabling the privileged operation of the first device includes sending the current location of the first device in a message to a pre-determined recipient.

20. The computer system of claim 16, wherein the one or more processors performing the first action disabling the privileged operation, further comprises:
the one or more processors disabling a factory reset function as the privileged operation of the first device; and
the one or more processors over-writing data stored on the first device.

* * * * *